(12) United States Patent
Hirayama

(10) Patent No.: US 6,930,810 B1
(45) Date of Patent: Aug. 16, 2005

(54) CORRECTION TABLE FORMING METHOD AND IMAGE FORMING APPARATUS

(75) Inventor: Masatsugu Hirayama, Yokohama (JP)

(73) Assignees: Kabushiki Kaisha Toshiba, Tokyo (JP); Toshiba TEC Kabushika Kaisha, Tokyo (JP)

( * ) Notice: Subject to any disclaimer, the term of this patent is extended or adjusted under 35 U.S.C. 154(b) by 909 days.

(21) Appl. No.: 09/722,700

(22) Filed: Nov. 28, 2000

(51) Int. Cl.$^7$ ............................................. G03F 3/08
(52) U.S. Cl. .................. 358/518; 358/3.2; 358/3.06; 358/536
(58) Field of Search .................. 358/3.1, 3.2, 501, 358/505, 534, 536, 518, 3.06, 3.07, 3.08, 3.05, 523, 527, 537, 520, 1.9, 1.15, 1.16, 504; 382/162, 167

(56) References Cited

U.S. PATENT DOCUMENTS

| | | | | |
|---|---|---|---|---|
| 4,752,822 A | * | 6/1988 | Kawamura .................. 358/523 |
| 5,045,931 A | * | 9/1991 | Sakamoto .................. 358/534 |
| 5,101,283 A | * | 3/1992 | Seki et al. ................. 358/3.13 |
| 5,124,803 A | * | 6/1992 | Troxel ....................... 358/3.26 |
| 5,130,820 A | * | 7/1992 | Hirota ....................... 358/447 |
| 5,166,809 A | * | 11/1992 | Surbrook .................... 358/1.9 |
| 5,249,042 A | * | 9/1993 | Kaji et al. .................. 358/500 |
| 5,253,082 A | * | 10/1993 | Hayashi et al. ............. 358/1.9 |
| 5,404,156 A | * | 4/1995 | Yamada et al. ............ 347/115 |
| 5,687,300 A | * | 11/1997 | Cooper ....................... 358/1.9 |
| 5,731,884 A | * | 3/1998 | Inoue ........................ 358/3.06 |
| 5,774,229 A | * | 6/1998 | Delabastita ................ 358/3.07 |
| 5,778,091 A | * | 7/1998 | Shibazaki et al. .......... 382/162 |
| 5,781,709 A | * | 7/1998 | Usami et al. ................ 358/1.9 |
| 5,831,626 A | * | 11/1998 | Sano et al. ................. 345/596 |
| 5,937,232 A | * | 8/1999 | Taguchi et al. ............... 399/81 |
| 5,966,222 A | * | 10/1999 | Hirata et al. ................ 358/520 |
| 6,029,023 A | * | 2/2000 | Munemori et al. ........... 399/66 |
| 6,115,150 A | | 9/2000 | Nakamura et al. |
| 6,121,997 A | * | 9/2000 | Fukushima ................. 347/261 |
| 6,313,924 B2 | * | 11/2001 | Kanamori .................... 358/1.9 |
| 6,721,062 B1 | * | 4/2004 | Sawada et al. .............. 358/1.9 |
| 6,724,498 B1 | * | 4/2004 | Shimazaki .................. 358/1.8 |
| 2003/0081255 A1 | * | 5/2003 | Shimizu ...................... 358/2.1 |

FOREIGN PATENT DOCUMENTS

| | | |
|---|---|---|
| JP | 63-125055 A | 5/1988 |
| JP | 5-169720 | 7/1993 |
| JP | 9-233335 A | 9/1997 |
| JP | 11-088661 A | 3/1999 |

* cited by examiner

*Primary Examiner*—Kimberly Williams
*Assistant Examiner*—Tia Carter
(74) *Attorney, Agent, or Firm*—Foley & Lardner LLP

(57) ABSTRACT

A main CPU reads out CMY values as γ correction patch data from an NVRAM, and outputs a γ correction patch from a color printer section via a γ correction patch output section. The output γ correction patch (sheet) is read by a color scanner section 1 as RGB image data. The RGB image data is converted to CMY color signals by a color conversion section 131 and input to the main CPU via a buffer memory. The main CPU calculates patch read data from the CMY color signals and compares it with the γ correction patch data stored in the NVRAM. The main CPU then calculates an inverse function of a curve of the patch read data and forms γ correction tables of four colors, C, M, Y and K. The γ correction tables are used for full-color γ correction. On the other hand, the main CPU performs an arithmetic operation (error correction) of an error correction table h(x), with an output of black (K) at screen angle −63° being f(x) and an output of mono-color black (K) at screen angle 90° being g(x). The error correction table h(x) is used for γ correction of mono-color black.

2 Claims, 7 Drawing Sheets

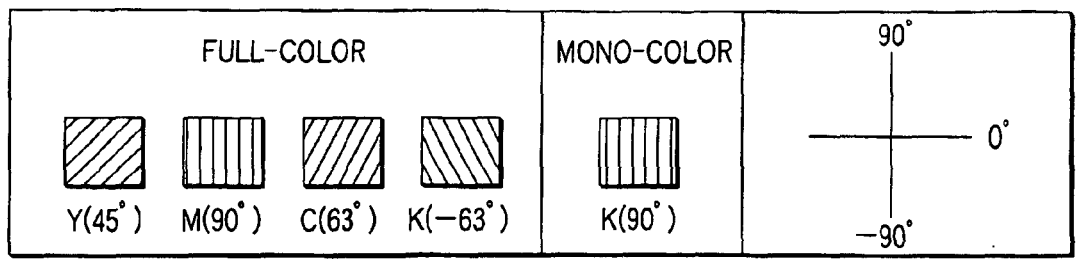
FIG. 5
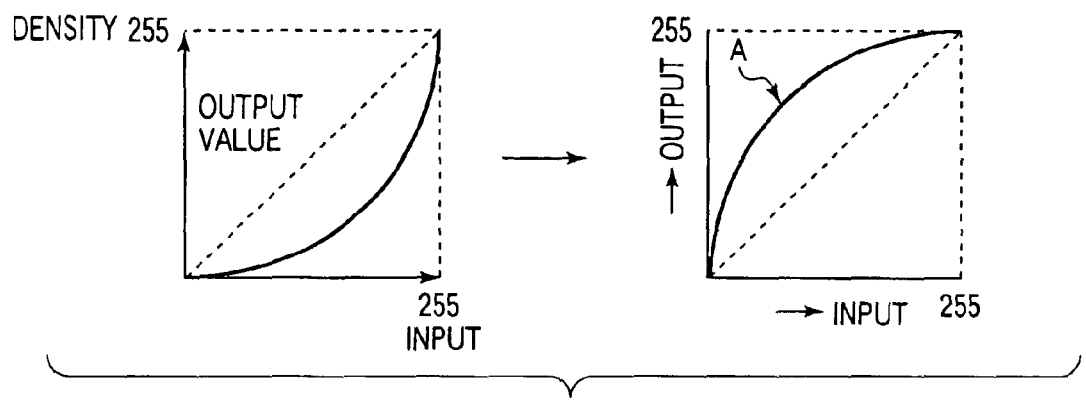
FIG. 6
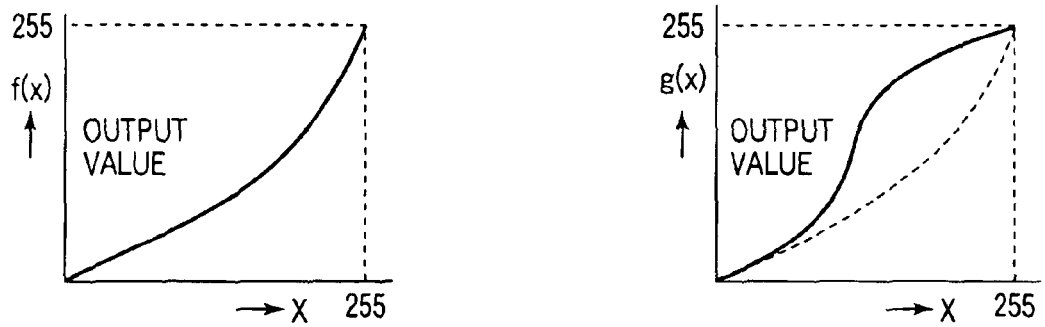
FIG. 7
FIG. 8
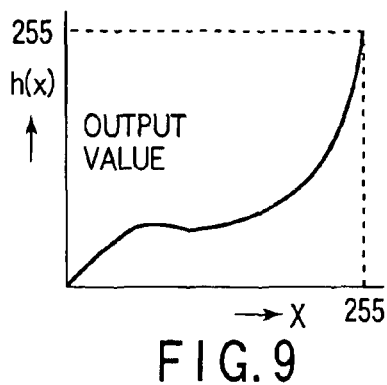
FIG. 9

CORRECTION TABLE FORMING METHOD AND IMAGE FORMING APPARATUS

BACKGROUND OF THE INVENTION

The present invention relates to a color image forming apparatus, and more particular to a correction table forming method for forming a correction table for correcting the color reproducibility and tone of a digital color copying machine, and to an image forming apparatus using the correction table.

In a conventional color copying machine using ink colors of Y (yellow), M (magenta), C (cyan) and K (black), properties relating to development, transfer, etc. will vary with a variation in environment and a variation with the passing of time, and it is thus difficult to maintain an optimal color image quality. With such varied properties, a copy image with high fidelity to the original cannot be reproduced.

General operators have difficulty in carrying out a work for adjusting a color balance, etc. and this work requires expertise. Only persons with skill can carry out the work. In order to solve this problem, for example, a gray patch and a black patch are generated from a mixture of the three colors. Color process parameters in an input-side color conversion section are corrected to effect gray balance adjustment. Thus, a variance, etc. in a reading apparatus is reduced. Subsequently, three-color gray patch data and black patch data are compared to effect $\gamma$ correction of an output. Thereby, a difficult gray-balance adjustment is carried out. In this example, the three-color-mixture gray patch data and black patch data are compared to effect the $\gamma$ correction of the output and thus the gray balance can be maintained. However, a tone of each record color cannot be maintained.

In order to maintain the tone of each color, Jpn. Pat. Appln. KOKAI Publication No. 5-169720, for instance, discloses a technique wherein a screen angle is applied to each pixel of each record color of a color image.

However, even where each color in a full-color mode is corrected, good reproducibility of the color of the human skin, for instance, cannot easily be obtained due to occurrence of moire. In addition, with this correction of each record color, good reproducibility of mono-color black cannot be obtained.

BRIEF SUMMARY OF THE INVENTION

The object of the present invention is to provide a correction table forming method for forming correction tables used in correction for attaining good reproducibility in a full-color mode and a mono-color black mode, and an image forming apparatus using the correction table.

According to an aspect of the invention, there is provided a correction table forming method for forming correction tables used in a color image forming apparatus having a color scanner and a color printer, wherein prestored correction data corresponding to plural colors is read out, color signals are generated at predetermined screen angles for the respective colors including black by using the correction data corresponding to the plural colors and printed out on a sheet by the color printer of the color image forming apparatus, the printed sheet is read by the color scanner of the color image forming apparatus, the read image data is converted to color signals, read data is calculated from the converted color signals, the calculated read data and the correction data corresponding to the plural colors are compared and calculated to form correction tables of the respective colors including black, prestored correction data corresponding to mono-color black is also read out, color signals are generated at a screen angle corresponding to the mono-color black by using the correction data corresponding to the mono-color black and printed out on a sheet by the color printer of the color image forming apparatus, the printed sheet is read by the color scanner of the color image forming apparatus, the read image data is converted to color signals, read data is calculated from the converted color signals, the calculated read data and the correction data corresponding to the mono-color black are compared and calculated to form a correction table of the mono-color black, and an error correction table is formed from the correction table of black included in the correction tables of the respective colors and the correction table of the mono-color black.

According to another aspect of the invention, there is provided a correction table forming method for forming correction tables used in a color image forming apparatus having a color scanner and a color printer, wherein prestored correction data corresponding to plural colors is read out, color signals including a first black and a second black are generated at predetermined screen angles for the respective colors including a screen angle for the first black and a screen angle for the second black, which differs from the screen angle for the first black, the color signals are printed out on a sheet by the color printer of the color image forming apparatus, the printed sheet is read by the color scanner of the color image forming apparatus, the read image data is converted to color signals, read data including the first black and second black is calculated from the converted color signals, the calculated read data including the first black and second black and the correction data corresponding to the plural colors are compared and calculated to form correction tables of the respective colors including the first black and second black.

According to still another aspect of the invention, there is provided an image forming apparatus comprising: read means for reading an image on an original; conversion means for converting image signals read by the read means to color signals; memory means for prestoring correction tables of colors including black and an error correction table of a mono-color black; setting means for setting a type of the original read by the read means and specifying whether the original is of a full-color mode or a mono-color black mode; first correction means for correcting, when the setting means has set the full-color mode, the color signals converted by the conversion means, using the correction tables of the respective colors including black stored in the memory means; second correction means for correcting, when the setting means has set the mono-color black mode, the color signals converted by the conversion means, using the correction tables of the respective colors including black stored in the memory means, and further correcting the corrected color signals using the error correction table of the mono-color black stored in the memory means; and image forming means for forming an image based on the color signals corrected by the first or second correction means.

According to still another aspect of the invention, there is provided an image forming apparatus comprising: read means for reading an image on an original; conversion means for converting image signals read by the read means to color signals; memory means for prestoring correction tables of colors formed at predetermined screen angles for the colors including a first black, and a correction table of a second black formed at a screen angle different from the screen angle of the first black in the correction tables of the respective colors; setting means for setting a type of the original read by the read means and specifying whether the original is of a full-color mode or a mono-color black mode; first correction means for correcting, when the setting means has set the full-color mode, the color signals converted by the conversion means, using the correction tables of the respective colors including the first black stored in the memory means; second correction means for correcting, when the setting means has set the mono-color black mode, the color signals converted by the conversion means, using the correction table of the second black stored in the memory means; and image forming means for forming an image based on the color signals corrected by the first or second correction means.

BRIEF DESCRIPTION OF SEVERAL VIEWS OF THE DRAWING

FIG. 5 is a view for explaining a screen pattern;

FIG. 6 is a view for explaining an arithmetic operation of a γ correction table;

FIG. 7 is a view for explaining the formation of an error correction table;

FIG. 8 is a view for explaining the formation of an error correction table;

FIG. 9 is a view for explaining the formation of an error correction table;

DETAILED DESCRIPTION OF THE INVENTION

Embodiments of the present invention will now be described with reference to the accompanying drawings.

Figure 1:
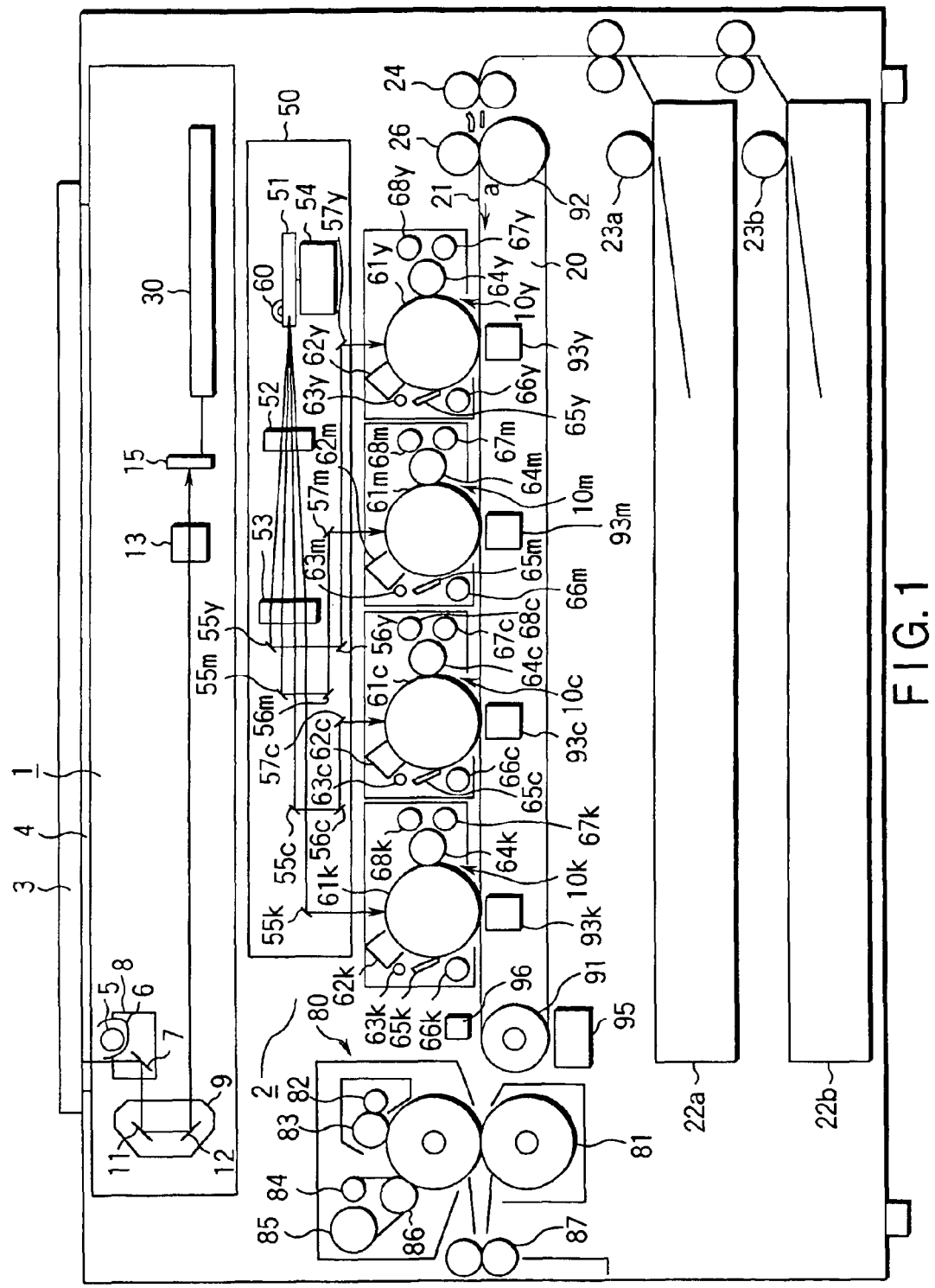
FIG. 1 schematically shows an internal structure of a color image forming apparatus according to the present invention, such as a digital color copying machine, for forming a copy image of a color image.

FIG. 1 schematically shows an internal structure of a color image forming apparatus according to the present invention, such as a digital color copying machine, for forming a copy image of a color image. In general terms, the color image forming apparatus comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the figure) deflecting the reflection light from the original which has been guided by the first mirror 7, and a third mirror 12 for deflecting the reflection from the second mirror 11 to the right in the figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13. An output from the CCD color image sensor 15 is delivered to a main control section 30 (to be described later).

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10y, 10m, 10c and 10k for producing images of four colors, yellow (Y), magenta (M), cyan (C) and black (K), which are color-separated according to a well-known subtractive color mixing process.

A convey mechanism 20 is disposed below the image forming units 10y, 10m, 10c and 10k. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming unit 10y, 10m, 10c and 10k includes a photosensitive drum 61y, 61m, 61c, 10k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
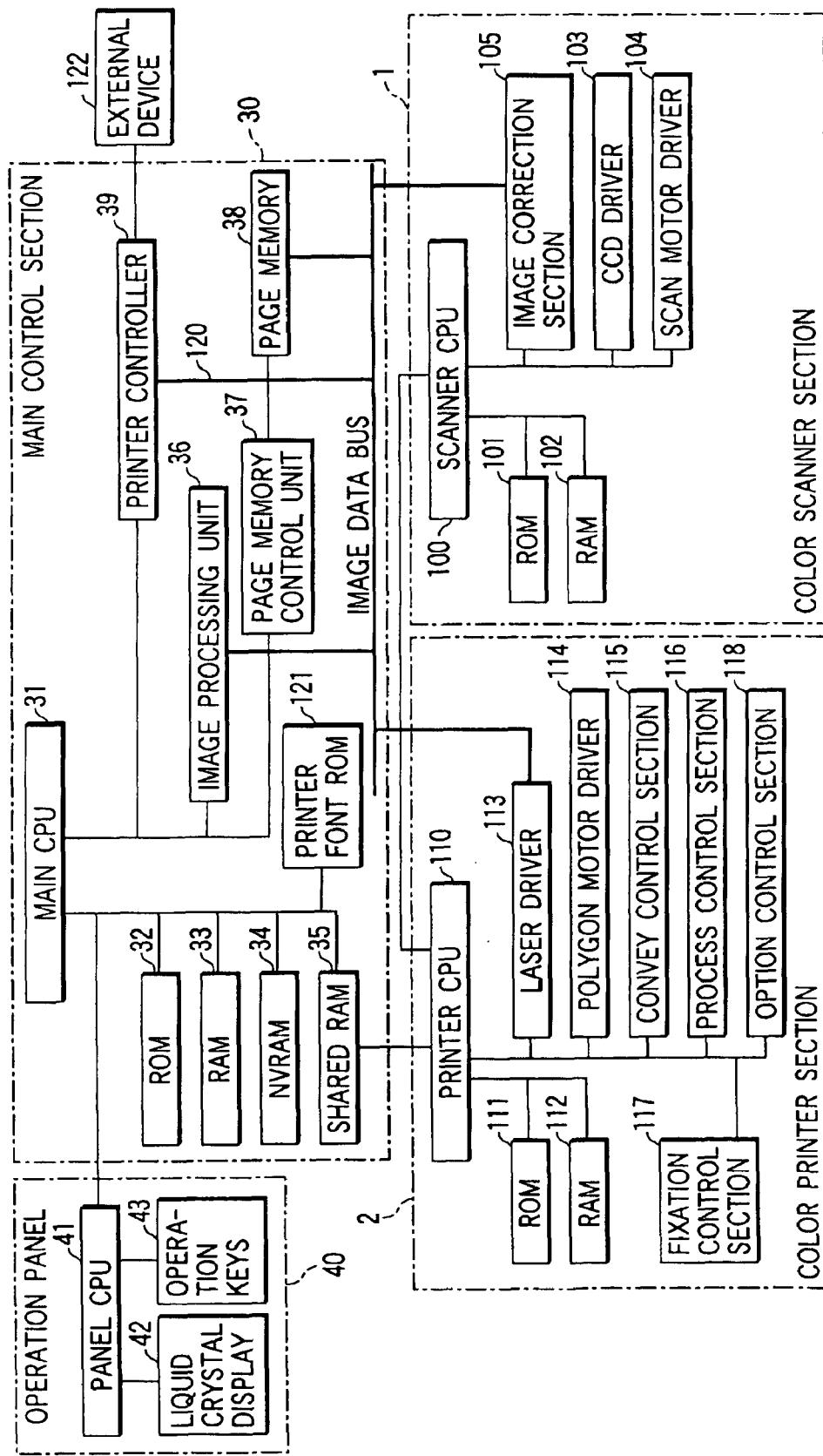
FIG. 2 is a block diagram schematically illustrating electrical connection in the color image forming apparatus shown in FIG. 1, and a flow of signals for control.

FIG. 2 is a block diagram schematically showing electrical connection of the digital copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 and a panel CPU 41 to which these are connected. The operation panel 40 is connected to the main CPU 31.

The main control section 30 comprises the main CPU 31, a ROM (Read-Only Memory) 32, a RAM 33, an NVRAM 34, shared RAM 35, image processing unit 36, a page memory control unit 37, a page memory 38, a printer controller 39, and a printer font ROM 121.

The main CPU 31 controls the entirety of the main control section 30. The ROM 32 stores control programs, etc. The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing unit 36, page memory 38, printer controller 39, image correction section 105 and laser driver 113 are connected over an image data bus 120.

Figure 3:
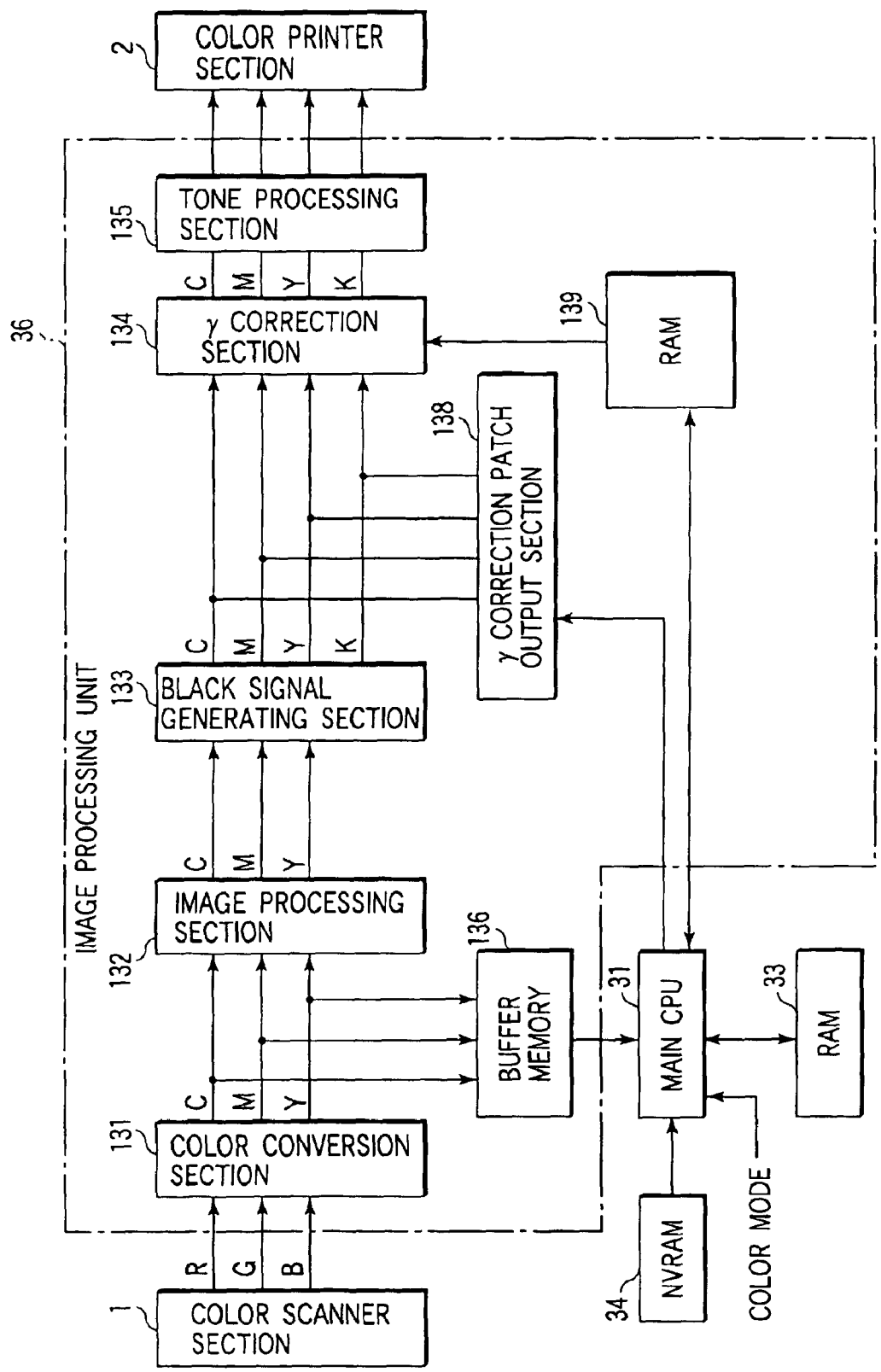
FIG. 3 is a block diagram schematically showing the structure of an image processing unit.

FIG. 3 schematically shows the structure of the image processing unit 36. In FIG. 3, image data R (red), G (green), B (blue) output from the color scanner section 1 is sent respectively to a color conversion section 131 in the image processing unit 36. The color conversion section 131 converts the input image data R, G, B to color signals of C (cyan), M (magenta) and Y (yellow). The color signals C, M and Y from the color conversion section 131 are sent to an image processing section 132. The image processing section 132 subjects the input color signals C, M and Y to various processings. Color signals C, M and Y output from the image processing section 132 are delivered respectively to a black signal generating section 133.

The black signal generating section 133 generates a signal of K (black) on the basis of the input color signals C, M and Y. Where color printing is effected, if three inks of C, M and Y are used, gray close to black is produced. In order to exactly print a black area as black pixels, the signal (K) for the black portion is produced. The signals of C, M, Y and K output from the black signal generating section 133 are sent to a γ correction section 134.

On the basis of the input signals of C, M, Y and K and corresponding pattern signals, the γ correction section 134 effects γ correction by referring to a γ correction table stored in a RAM 139. This is the most important feature of the present invention, and will be described later in greater detail. The γ-corrected signals C, M, Y and K output from the γ correction section 134 are delivered to a tone processing section 135. The tone processing section 135 subjects the input signals C, M, Y and K to, for instance, an error spread method, in accordance with the number of recordable bits of the color printer section 2. Signals C, M, Y and K output from the tone processing section 135 are delivered to the color printer section 2.

As will be described later in detail, when the γ correction table is to be formed, the color signals C, M and Y converted by the color conversion section 131 are buffered in a buffer memory 136 and sent to the main CPU 31.

The RAM 33 stores patch read data to be described later.

The NVRAM 34 stores γ correction patch data (CMY values) to be described later.

As will be described later in detail, when the γ correction table is to be formed, the main CPU 31 causes a γ correction patch output section 138 to deliver pattern signals corresponding to C, M, Y and K to the γ correction section 134.

Figure 4:
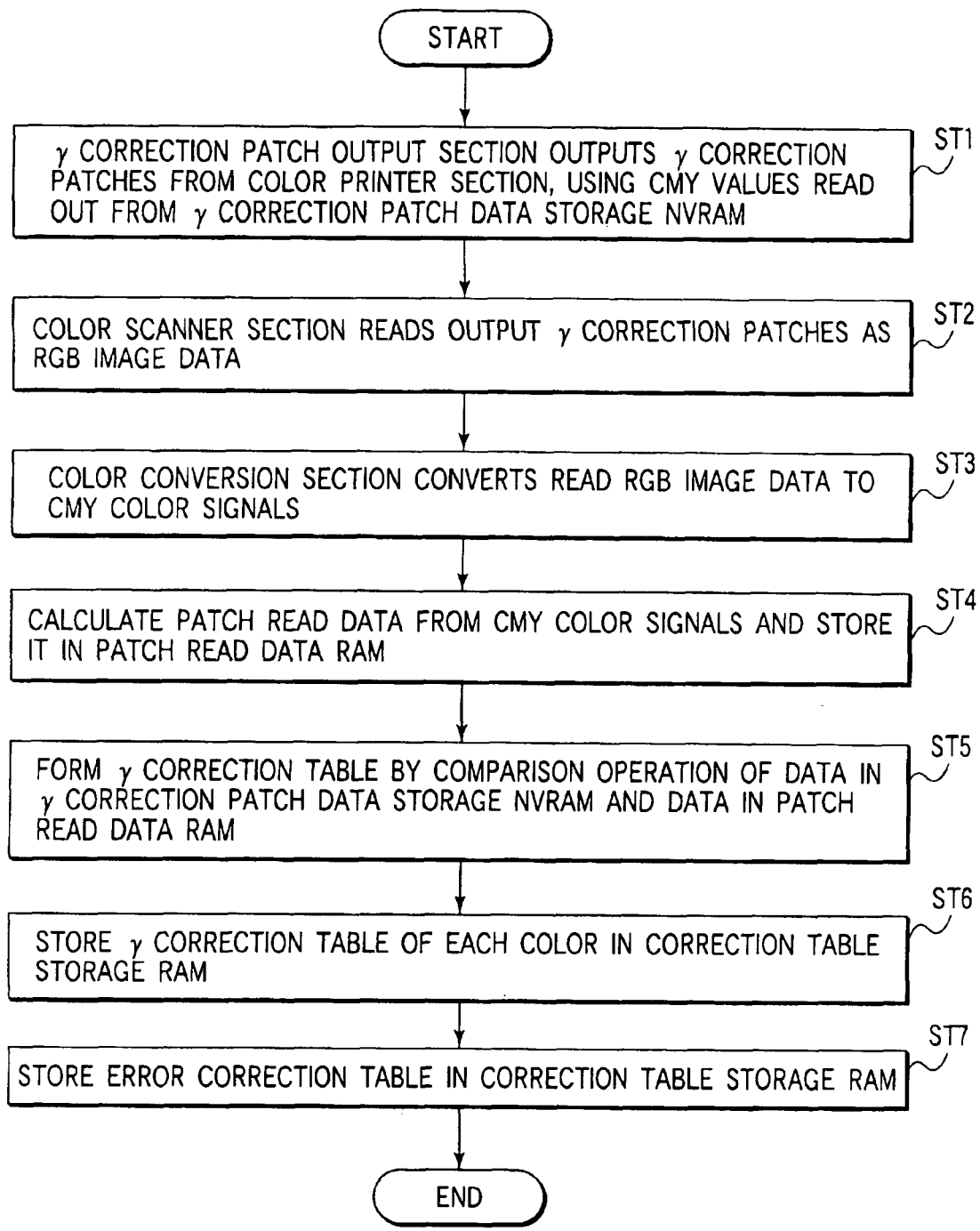
FIG. 4 is a flow chart illustrating an operation for forming a γ correction table.

The formation of the γ correction table in a full-color mode in the above-described structure according to a first embodiment of the invention will now be described with reference to a flow chart of FIG. 4.

To begin with, the main CPU 31 reads out CMY values as γ correction patch data from the NVRAM 34, and causes the γ correction patch output section 138 to output γ correction patches from the color printer section 2, using the read-out CMY values (ST1). Specifically, based on the CMY values from the main CPU 31, the γ correction patch output section 138 outputs CMYK pattern signals to the γ correction section 134. In this case, the γ correction patch output section 138 outputs a screen pattern with a multi-line structure with yellow (Y) at 45°, magenta (M) at 90° cyan (C) at 630, and black (K) at −63°, as indicated by "FULL COLOR" in FIG. 5.

As regards most of printed matters, magenta (M) is printed out at 45°. If the copy output angle is not near 45°, there hardly occurs moire of magenta (M) which is conspicuous due to interference between the original and the screen pattern. Thereby, the possibility of occurrence of moire can be decreased with respect to a color original in which magenta (M) is used for the human skin.

Thus, the γ correction patch (sheet) is output from the color printer section 2 via the γ correction section 134 and tone processing section 135.

Then, the output γ correction patch (sheet) is read by the color scanner section 1 as RGB image data (ST2). The RGB image data is formed of 256-gradient signals for each color.

The RGB image data read by the color scanner section 1 is converted to CMY color signals by the color conversion section 131 (ST3).

The main CPU 31 takes in the CMY color signals converted by the color conversion section 131 via the buffer memory 136. Based on the CMY color signals, the main CPU 31 calculates patch read data and stores it in the RAM 33 (ST4).

The main CPU 31 compares the γ correction patch data stored in the NVRAM 34 and the patch read data stored in the RAM 33, and calculates an inverse function of the curve of the patch read data, as shown in FIG. 6, thereby forming γ correction tables A for the four colors of C, M, Y and K (ST5).

The main CPU 31 stores the formed γ correction tables in the RAM 139 (ST6).

On the other hand, as regards black (K) in the mono-color mode, importance is put on the reproducibility of thin lines or thin characters and the screen angle is set at 90°, and not −63°, as indicated by "MONO-COLOR" in FIG. 5. As mentioned above, the γ correction of black (K) is effected at the screen angle −63°. If the screen angle 90° is used for output, the tone reproducibility becomes inconsistent. Thus, the error in tone reproducibility is calculated by the main CPU 31 (error correction) and stored in the RAM 139 (ST7).

In this calculation, assume that the output at the screen angle −630 of black (K: first black) obtained when the black (K) correction is performed using the full-color γ correction table with −63° is f(x), and the output at the screen angle 90° of mono-color black (K: second black) is g(x). Then, an error correction table h(x) is given by $$h(x) = g^{-1}(x) \times f(x)$$

where $g^{-1}(x)$ is an inverse function of g(x).

FIGS. 7, 8 and 9 illustrate the formation of the error correction table h(x). FIG. 7 shows the output f(x) of black (K) at screen angle −63° after correction using the full-color γ correction table with which the black (K) is output at screen angle −63°.

FIG. 8 shows g(x) obtained when the mono-color black (K) is output at screen angle 90°. The main CPU 31 reads out the value of black (K) as γ correction patch data prestored in NVRAM 34 and causes the γ correction patch output section 138 to output a screen pattern with a multi-line structure with the screen angle 90° of black (K). Thus, the γ correction patch is output from the color printer section 2. When the output γ correction patch (sheet) is read by the color scanner section 1 as RGB image data, the main CPU 31 causes the color conversion section 131 to convert the RGB image data to CMY color signals and takes in them via the buffer memory. Based on the CMY color signals, the main CPU 31 calculates the patch read data and stores it in the RAM 33. The main CPU 31 compares the γ correction patch data stored in the NVRAM 34 and the patch read data stored in the RAM 33, and calculates an inverse function of the curve of the patch read data. Thus, the output g(x) at the screen angle 90° of mono-color black (K) is obtained.

FIG. 9 shows the error correction table h(x) formed by the error correction in the main CPU 31. Specifically, the main CPU 31 performs error correction based on the f(x) shown in FIG. 7 and the g(x) shown in FIG. 8 and forms the error correction table h(x).

Thus, the main CPU 31 enables the γ correction section 134 to effect γ correction using the γ correction tables of the respective colors and error correction table which are stored in the RAM 139 according to the full-color mode or mono-color mode black set through the operation panel 40. Thereby, good reproducibility can be obtained.

Figures 10, 11:
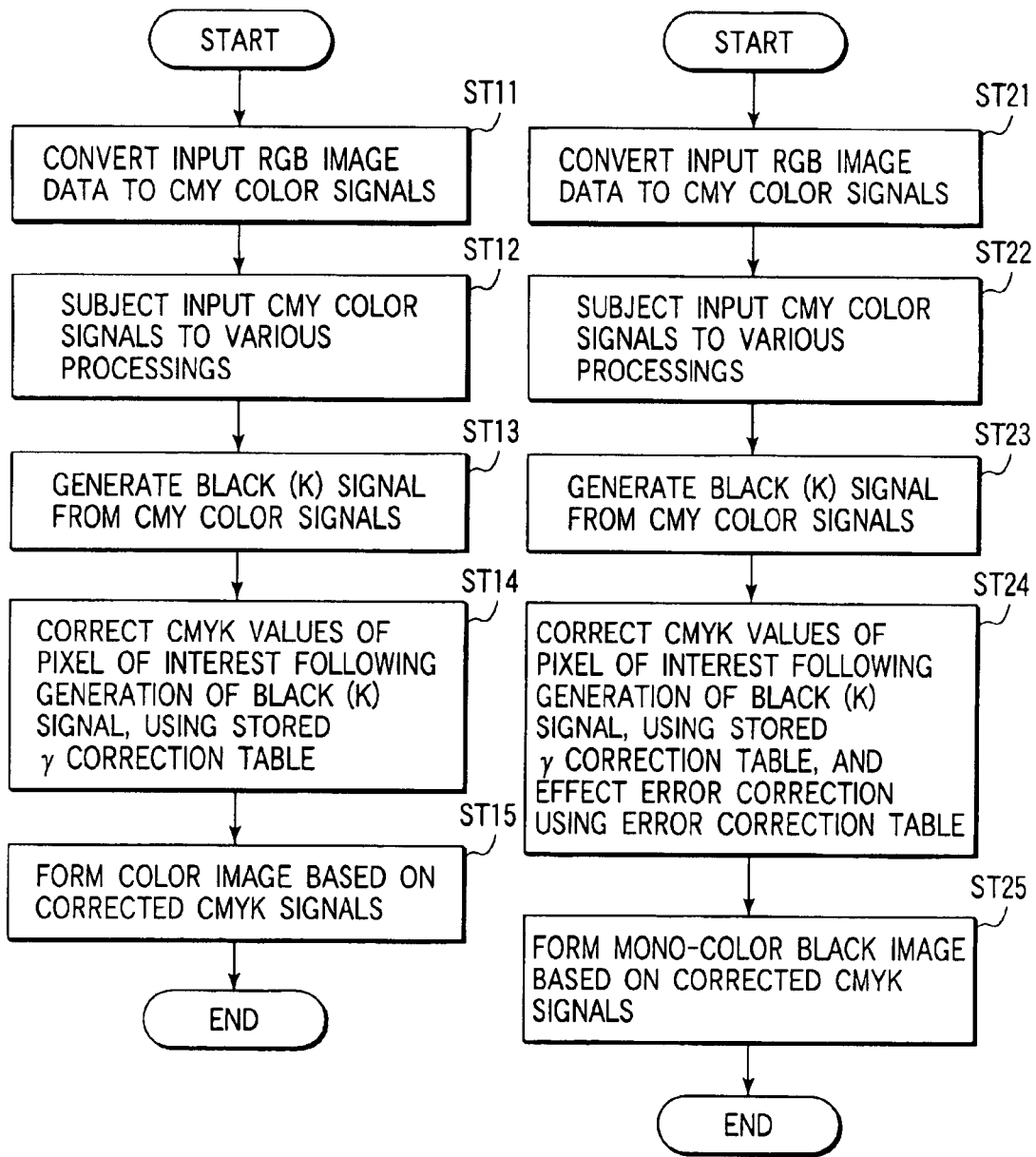
FIG. 10 is a flow chart illustrating the operation of γ correction in a full-color mode.
FIG. 11 is a flow chart illustrating the operation of correction in a mono-color black mode.

The γ correction operation in the "full-color" mode in the color image forming apparatus will now be described with reference to a flow chart of FIG. 10.

Assume that the color mode is set to the full-color mode through the operation panel 40 in the color image forming apparatus.

The RGB image data read by the color scanner section 1 is input to the image processing unit 36.

In the image processing unit 36, the color conversion section 131 converts the input image data R, G, B to color signals of C (cyan), M (magenta) and Y (yellow) (ST11) and sends them to the image processing section 132. The image processing section 132 subjects the input color signals C, M and Y to various processings and delivers the resultant signals to the black signal generating section 133 (ST12).

The black signal generating section 133 generates a signal of K (black) on the basis of the input color signals C, M and Y (ST13). The generated signals of C, M, Y and K are output to the γ correction section 134.

Based on the γ correction tables of C, M, Y and K stored in the RAM 139, the γ correction section 134 corrects the values of the CMYK signals of the pixel of interest, which are input from the black signal generating section 133 (ST14). The γ correction section 134 outputs the corrected CMYK signals to the tone processing section 135.

The tone processing section 135 subjects the input CMYK signals to tone processing in accordance with the number of recordable bits of the color printer section 2, and delivers the resultant signals to the color printer section 2.

The color printer section 2 forms a color image on the basis of the CMYK signals output from the tone processing section 135 of the image processing unit 36 (ST15).

The correction operation in the mono-color black mode in the color image forming apparatus will now be described with reference to a flow chart of FIG. 11.

Assume that the color mode is set to the mono-color black mode through the operation panel 40 in the color image forming apparatus.

The RGB image data read by the color scanner section 1 is input to the image processing unit 36.

In the image processing unit 36, the color conversion section 131 converts the input image data R, G, B to color signals of C (cyan), M (magenta) and Y (yellow) (ST21) and sends them to the image processing section 132. Where the original is of the mono-color black type, the CMY color signals are the same. The image processing section 132 subjects the input color signals C, M and Y to various processings and delivers the resultant signals to the black signal generating section 133 (ST22).

The black signal generating section 133 generates a signal of K (black) on the basis of the input color signals C, M and Y (ST23). The generated signals of C, M, Y and K are directly output to the γ correction section 134.

Based on the γ correction tables stored in the RAM 139, the γ correction section 134 corrects the values of the CMYK signals of the pixel of interest, which are input from the black signal generating section 133, and it effects error correction using the error correction table h(x) (ST24). The γ correction section 134 outputs the corrected CMYK signals to the tone processing section 135.

The tone processing section 135 subjects the input CMYK signals to tone processing in accordance with the number of recordable bits of the color printer section 2, and delivers the resultant signals to the color printer section 2.

The color printer section 2 forms a mono-color black image on the basis of the CMYX signals output from the tone processing section 135 of the image processing unit 36 (ST25).

In step ST24, the correction based on the error correction table is effected following the correction based on the γ correction tables. It is possible, however, to effect the correction using a correction table obtained in advance by synthesizing the γ correction tables and error correction table.

A second embodiment of the invention will now be described.

In the first embodiment, calculations are performed in the main CPU 31 when the copy output screen angles are set such that the full-color black is set at −63° and the mono-color black is set at 90° In the second embodiment of the invention, the screen angles of −63° and 90° for black are prepared in advance.

Figure 12:
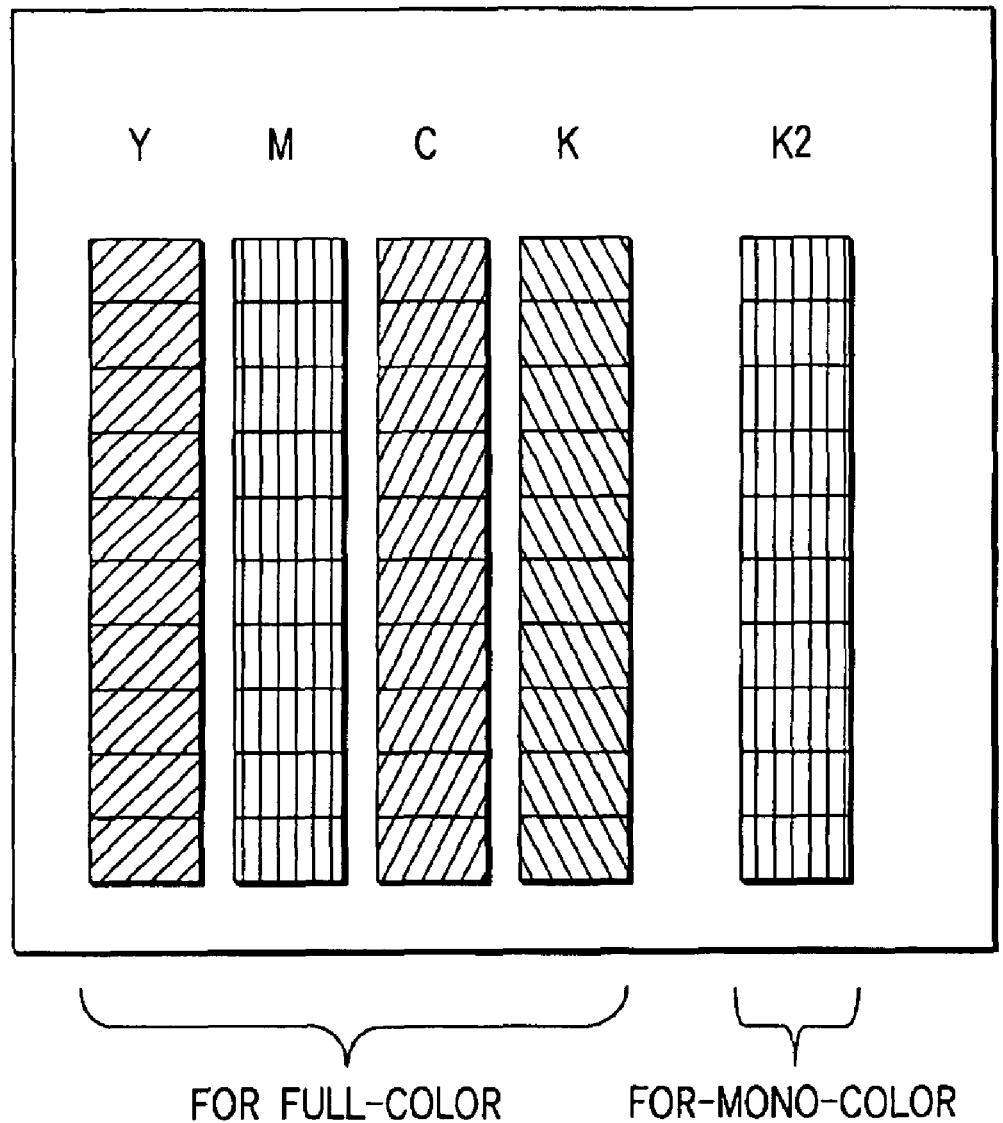
FIG. 12 shows an example of arrangement of y correction patches used in a second embodiment of the invention.

FIG. 12 shows an example of arrangement of γ correction patches used in the second embodiment of the invention. Specifically, two patches of black (K, $K_2$) output at −63° and 90° are prepared in advance as γ correction patches.

In this case, the γ correction patch (sheet) to be read by the color scanner section 1 contains five colors, YMCK+$K_2$, and 256-gradient signals are formed for each color.

The main CPU 31 effects γ correction of the read values of the five colors, Y, M, C, K and $K_2$, and calculates γ correction tables of the respective colors. Accordingly, in the second embodiment, no error correction is required and the γ correction section 134 uses the γ correction tables of the screen angles corresponding to the respective copy outputs (full-color, mono-color black).

In the second embodiment, the "full-color" correction operation is the same as that in the first embodiment and a description thereof may be omitted. The "mono-color black" correction operation in the second embodiment is common to that in the first embodiment, except that in the first embodiment the correction based on the γ correction tables stored in the RAM 139 is followed by the correction based on the error correction table h(x), whereas in the second embodiment the correction based on the γ correction table of the mono-color black ($K_2$) stored in the RAM 139 is effected. Thus, a description thereof is omitted.

As has been described above, according to the embodiments of the present invention, a copy output in the full-color copy mode can be obtained using the combination of the screen angles which causes less moire, in consideration of the screen angles of the CMYK color signals associated with the printed original.

In addition, in the mono-color black mode, correction can be effected using the screen angles which cause less moire or can enhance reproducibility of thin characters, independent from the screen angles in the full-color copy mode.

Furthermore, in accordance with the difference in screen angle for black, the table conversion can be effected to match with the screen angle of mono-color black, following the full-color γ correction.

Alternatively, a patch for mono-color black may be added to γ correction patches.

What is claimed is:

1. A correction table forming method for forming correction tables used in a color image forming apparatus having a color scanner and a color printer, said correction table forming method comprising:

reading out prestored correction data corresponding to plural colors;

generating color signals at predetermined screen angles for the respective colors including black by using the correction data corresponding to the plural colors;

printing out the color signals on a sheet by use of the color printer of the color image forming apparatus;

reading the printed sheet by use of the color scanner of the color image forming apparatus;

converting the read image data to color signals;

calculating read data from the converted color signals;

comparing and calculating the calculated read data and the correction data corresponding to the plural colors to form correction tables of the respective colors including black;

reading out prestored correction data corresponding to mono-color black;

generating color signals at a screen angle corresponding to the mono-color black by using the correction data corresponding to the mono-color black;

printing out the color signals on a sheet by use of the color printer of the color image forming apparatus;

reading the printed sheet by use of the color scanner of the color image forming apparatus;

converting the read image data to color signals;

calculating read data from the converted color signals;

comparing and calculating the calculated read data and the correction data corresponding to the mono-color black to form a correction table of the mono-color black; and forming an error correction table from the correction table of black included in the correction tables of the respective colors and the correction table of the mono-color black.

2. A correction table forming method for forming correction tables used in a color image forming apparatus having a color scanner and a color printer, said correction table forming method comprising:

reading out prestored correction data corresponding to plural colors;

generating color signals including a first black and a second black at predetermined screen angles for the respective colors including a screen angle for the first black and a screen angle for the second black, which differs from the screen angle for the first black;

printing out the color signals on a sheet by use of the color printer of the color image forming apparatus;

reading the printed sheet by use of the color scanner of the color image forming apparatuses converting the read image data to color signals;

calculating read data including the first black and second black from the converted color signals; and comparing the calculated read data including the first black and second black with the correction data corresponding to the plural colors and performing calculation to form correction tables of the respective colors including the first black and second black.

* * * * *